US008628624B2

(12) United States Patent
Turner et al.

(10) Patent No.: US 8,628,624 B2
(45) Date of Patent: Jan. 14, 2014

(54) LASER CLEANING OF COMPONENTS

(75) Inventors: Mark W. Turner, Colne (GB); Alistair J. E. Smith, Nottingham (GB); Philippus L. Crouse, Manchester (GB)

(73) Assignee: Rolls-Royce PLC, London (GB)

( * ) Notice: Subject to any disclaimer, the term of this patent is extended or adjusted under 35 U.S.C. 154(b) by 1434 days.

(21) Appl. No.: 11/878,885

(22) Filed: Jul. 27, 2007

(65) Prior Publication Data
US 2008/0178905 A1 Jul. 31, 2008

(30) Foreign Application Priority Data

Jul. 31, 2006 (GB) .................................. 0615153.4

(51) Int. Cl.
*B08B 7/00* (2006.01)
(52) U.S. Cl.
USPC ....................................... 134/1; 134/18; 15/1
(58) Field of Classification Search
None
See application file for complete search history.

(56) References Cited

U.S. PATENT DOCUMENTS 5,681,395 A 10/1997 Werner
6,698,900 B1 * 3/2004 Young et al. .................... 353/79

FOREIGN PATENT DOCUMENTS

| DE | 197 15 702 A1 | 10/1998 |
|----|---------------|---------|
| EP | 1 342 510 A3 | 9/2003 |
| FR | 2 692 822 | 12/1993 |
| FR | 2 703 618 A1 | 10/1994 |
| WO | WO 96/09128 A1 | 3/1996 |

* cited by examiner

*Primary Examiner* — Eric Golightly
(74) *Attorney, Agent, or Firm* — Oliff and Berridge, PLC

(57) ABSTRACT

A method and system for removing substances from a surface, in which the surface is irradiated by high-energy laser radiation, characterized in that the laser parameters are chosen to selectively remove one or more predetermined substances from the surface without removing other substances from the surface.

4 Claims, 3 Drawing Sheets

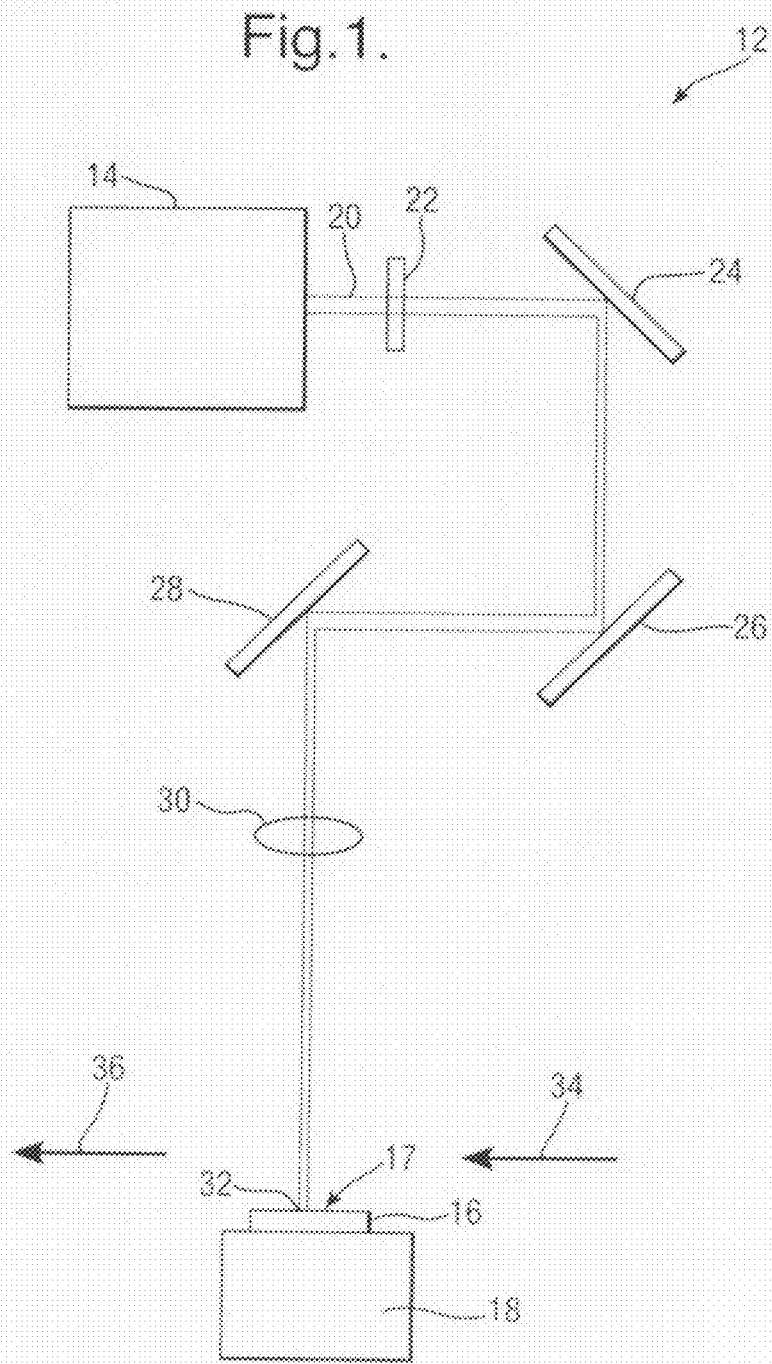

LASER CLEANING OF COMPONENTS

This invention relates to laser cleaning of the surfaces of components.

In many manufacturing processes, such as in the automotive or aerospace industries, components have to be cleaned prior to joining or coating. Conventionally this cleaning is performed by the full immersion of components in chemical solutions, many of which are expensive and environmentally malign.

As an alternative, it is known to use a cleaning process which involves the irradiation of a surface by laser to remove contaminants. Existing laser based systems are based upon lasers which have either remove only a limited range of contaminants or have the potential to do metallurgical damage to the substrate.

Titanium alloys are widely employed in the aerospace industry for components such as compressor drums and fan blades due to their high specific strength. Titanium 6% aluminium 4% vanadium (Ti64) is one of the most commonly used. Two of the most sensitive joining techniques for this class of material are electron beam welding (EBW) and diffusion bonding (DB). Surgically clean damage free surfaces are imperative for acceptable joints. Cleaning has traditionally been performed mechanically and chemically, and is both manually intensive and environmentally unsound. Concentrated halide-based acids are frequently employed which generate unacceptably high effluent volumes.

It would be desirable to have a cleaning method for such materials that does not have the disadvantages of known methods. To satisfy product-integrity requirements, the laser-based cleaning process must be assured to aerospace quality standards. Amongst these requirements it must be demonstrated to produce no adverse effects upon the component surfaces, and must be understood thermodynamically. Unacceptable surface interactions include material melting, microstructural phase transformation or heat-affected zones. The process must not create thermally induced chemical reactions, such as oxidation from atmospheric reaction. Freedom from crystallographic transformation and thermally induced residual stresses must also be verified, along with the absence of material transfer from redeposited condensate. The laser process must be sufficiently effective for the benefits of the irradiation to endure for a time period compatible with production.

It is an object of this invention to provide an improved method of laser cleaning, which permits selective removal of contaminants from a surface. This would be particularly useful where other substances are also present on the surface of a component, but these are not to be removed.

According to the invention, there is provided a method and a system for removing substances from a surface as claimed in the independent claims.

The invention will now be described, by way of example, with reference to the accompanying drawings, in which:

FIG. 1 is a schematic diagram of a laser cleaning system according to the invention;

FIG. 3(a) is a partially cleaned specimen, and FIG. 3(b) is a fully cleaned specimen.

Figure 2A:
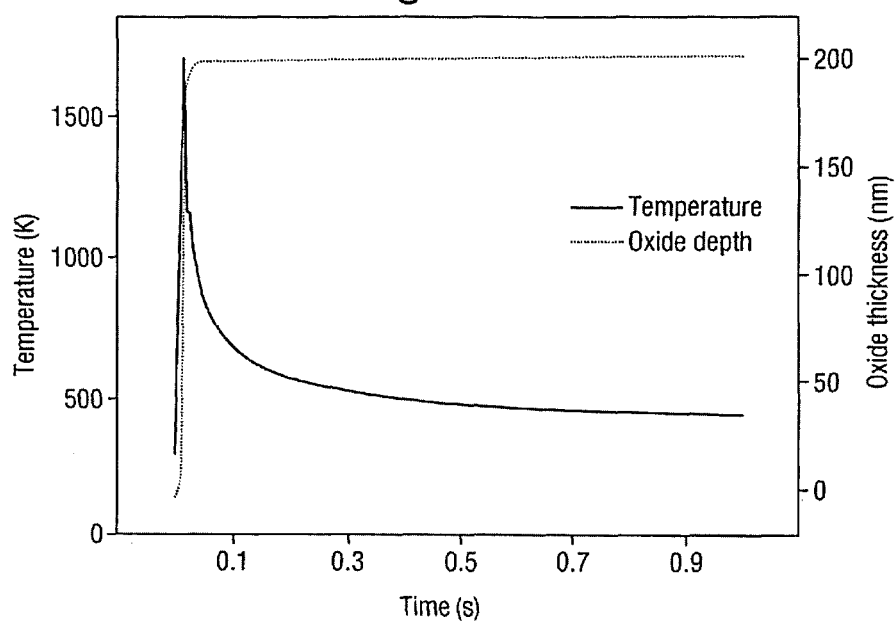
FIG. 2 shows predicted oxide formation during treatment, for the three lasers.

In FIG. 1, a laser cleaning system is shown generally at 12.

A high-energy laser source 14 provides a beam of laser radiation 20. A laser control system (not shown) controls various parameters of the laser's operation. The laser may be pulsed or continuous wave (CW). If pulsed, the control system determines the pulse length and pulse energy.

A component 16, whose surface 17 is to be cleaned, is mounted on a traverse system 18. The component 16 is mounted by means of a fixture, which is not shown. The traverse system 18 may take any suitable form, and is provided to permit the component 16 to be moved relative to the beam of laser radiation 20. The movement may be translational or rotational, or a combination of the two.

After leaving the laser source 14, the beam 20 passes through a pre-focusing lens 22. The beam 20 is then guided by a succession of mirrors 24, 26, 28 towards the surface 17 of the component 16. A focusing lens 30 focuses the beam 20 to produce the desired spot size 32 on the surface 17 of the component 16.

The laser cleaning process works by selection of the laser system, beam wavelength and cleaning parameters based upon the material properties of the article. Interrogation of available material property data and use of a model of the cleaning system allows customisation of the process parameters to the substrate, permitting removal of the widest range of contaminants with minimum risk of damage to the substrate. The mode of use involves identification of the substrate material and properties (e.g. reflectivity, density, specific heat, thermal conductivity) and approximate contaminant chemistry (e.g. extinction coefficient, fluence damage threshold). The laser system and parameters are selected to ensure that no damage (e.g. oxidation, phase change or melting) is done to the component 16, while ensuring that the surface 17 remains clean for sufficient time to complete the joining operations.

The beam 20 is rastered across the area of the component 16 to be cleaned by the traverse system 18. An inert gas flows across the work surface (as indicated by the arrow 34), and a suitably located exhaust extraction system (as indicated by the arrow 36) is employed to prevent the removed contaminants from being re-deposited on the surface 17.

The component 16 may be monitored during the cleaning process to ensure that it is thoroughly cleaned. This can be done either by visual means or by various real-time process monitoring systems, for example acoustic or spectroscopic means.

To show more clearly how the invention may be put into effect, three specific examples will now be described. Three laser types—viz. a continuous-wave $CO_2$ laser, a Q-switched Nd:YAG, and a KrF excimer—were used, and the interaction of the laser beams with a variety of the most common alloys employed and contaminants identified in the production plants were investigated. Surface sampling confirmed the presence of organic and inorganic particulates, metallic swarf, oils and grease, and variations in the depth of the native titanium surface oxide. Analytical techniques, ranging from optical microscopy, to wettability testing, to x-ray photoelectron spectroscopy were used to assess the effectiveness of the cleaning. Successful EBW and DB of test pieces were used as the definitive arbiter for process evaluation.

The experimental programme used for each laser was based upon development of the beam-substrate and beam-contaminant interactions, which were used to develop the optimised cleaning conditions. These parameters were then applied to EB weld and diffusion bonding test pieces. The first programme of trials was performed on a Maxi Mark III Q-switched Nd:YAG laser, wavelength $\lambda=1064$ nm, frequency range 1-30 kHz, spot diameter 180 μm, pulse length 100 ns, peak power 0.1-88 kW, and a focal length of 200 mm. The beam incidence angle was maintained within 10° of the sample surface normal. The second phase of work was performed on a Spectron CO$_2$ laser, $\lambda$=10.6 μm, 130 W maximum power, operating in continuous wave mode, spot diameter 370 μm, and a focal length of 200 mm. The beam incidence angle was maintained within 30° of the sample surface normal. The latest work was performed on a GSI Lumonics pulsed KrF excimer, $\lambda$=248 nm, 1-100 Hz, pulse width 12-14 ns, 38 MW peak power, focal length 180 mm. The beam incidence angle was maintained within 30° of the sample surface normal. For each wavelength system the substrate and contaminant absorption characteristics were assessed. Fluence and traverse scanning speed were varied to determine the melt damage threshold conditions for the laser systems. Ablation thresholds were determined gravimetrically for the trial contaminants applied to the test piece surfaces. Samples were processed in the as-supplied condition, and again with contaminants applied, and evaluated by optical microscopy and XPS. Surface oxidation effects were evaluated both experimentally and by use of a thermal model discussed below. XPS analysis was performed on a Surface Science Instruments (SSI) M-Probe (AlK$\alpha$, 1486.6 eV) by CSMA Ltd. Test pieces representative of component joint configurations were laser processed with seeded contaminants, for EB weld and diffusion bonding trials. All EB test pieces were welded on a Steigerwald K100 150 kW machine to validated parameters, whilst the diffusion bonds were created by hot isostatic pressing at >900° C. for 2 hours. The test pieces were subsequently evaluated by non-destructive evaluation before metallographic assessment of the joint quality.

A one-dimensional enthalpy based thermal model was developed in parallel with the experimental work to evaluate near surface temperature histories and for postulating laser-contaminant interaction mechanisms. Time-dependent temperature distributions were calculated explicitly from a central-difference discretized formulation of Fourier's second law with the integration path across the contaminant film and an appropriate number of times the thermal penetration depth (i.e. $[\alpha \tau]^{1/2}$, with $\alpha$ the thermal diffusivity and $\tau$ the interaction time) into the substrate. The beam was assumed to reflect off the substrate, but to be absorbed by the contaminants. Oxidation rate equations were determined experimentally, and oxidation was superimposed on the surface temperature profiles to evaluate oxide formation.

The experimental melt damage thresholds for pre-etched Ti64 were found to be 1.6×10$^6$, 708, and 450 mJ·cm$^{-2}$ for the CO$_2$, Nd:YAG, and excimer lasers respectively. The conditions at which the melt damage thresholds were determined were: a full interaction time of 14.8 ms for the CO$_2$ laser, a 90-pulse train at 25 kHz for the Nd:YAG, and a 10-pulse train at 100 Hz for the excimer. The process fluence selected for each contaminant was well below the damage threshold for the substrate, typically 150-200 mJ·cm$^{-2}$ for the excimer, and 400-500 mJ·cm$^{-2}$ for the Nd:YAG.

Figure 2B:
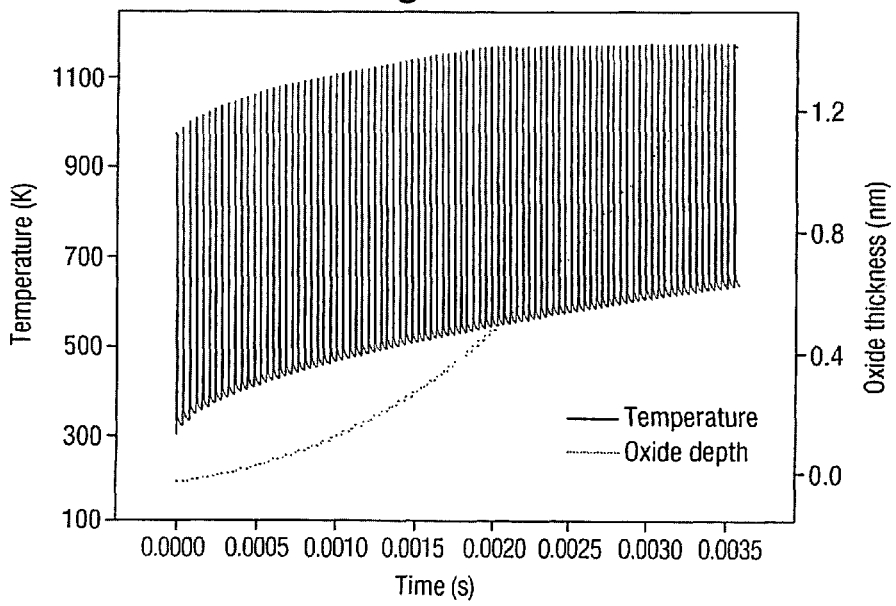
Figure 2C:
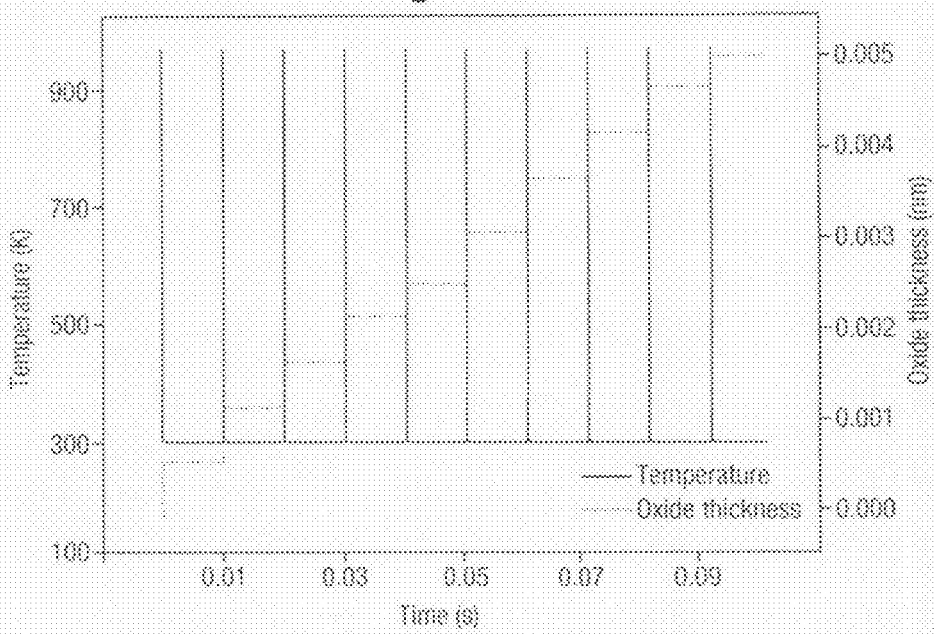

The temperature histories for the substrate surfaces were used to calculate the associated oxide film thickness at the operating conditions for the three laser systems. FIG. 2 illustrates typical test cases for the three laser types. FIG. 2(a) relates to the CO$_2$ laser, (b) to the Nd:YAG and (c) to the excimer. These predicted values are in line with the experimental observations and XPS surface analysis data. For the CO$_2$ laser, the surface remains above the oxidation threshold (~400° C.) for tens of ms, and oxide films of some 200 nm are predicted.

This agrees with the experimental observations and XPS results, with obvious discoloration typical of oxidation reactions being observed. The maximum temperature predicted for the Nd:YAG case approaches the $\beta$-transus of the alloy (approx 1000° C.), and there is a slow build up of residual temperature between pulses. This base temperature remains under the oxidation threshold and oxide growth takes place only during the high-temperature peaks. Again the time scale is such that oxide growth is minimal, and a few nm only are predicted and detected. In the case of the excimer, the post-treatment surface displays increased reflectivity without any sign of discoloration. Despite the fact that the maximum calculated temperature is above the oxidation threshold, the temperature rise and drop are very rapid and the surface effectively returns to room temperature well before the start of each successive pulse. Since oxidation is diffusion controlled there appears to be insufficient time for it to occur to any significant depth.

The Beer-Lambert penetration depths and ablation damage thresholds for two typical contaminants, synthetic oil and silicone grease, are given in Table 1.

TABLE 1

| Contaminant | $\lambda$ (μm) | $\delta_{B-L}$ (μm) | $F_{Threshold}$ (mJ·cm$^{-2}$) |
|---|---|---|---|
| Synthetic oil | 10.6 | 390 | 350 |
| Silicone grease | 10.6 | 2 | — |
| Synthetic oil | 1.06 | ∞ | — |
| Silicone grease | 1.06 | 10500 | — |
| Synthetic oil | 0.248 | 0.360 | 55 |
| Silicone grease | 0.248 | 0.110 | 38 |

The thermo-chemical properties of the synthetic oil were taken to be similar to those of dodecane, with a boiling point of 370° C. This contaminant was found to be relatively easily removed by all three laser systems. For the CO$_2$ laser the beam couples sufficiently with the oil for direct heating to occur, while for the Nd:YAG, heating is indirect, by conduction from the metal surface. From Table 1 it is clear that coupling is better than three orders of magnitude better at 248 nm than at 10.6 μm. For the CO$_2$ laser the coupling is via excitation of vibrational modes, while in the UV, electronic excitation leading to bond breaking takes place.

Thermo-gravimetric analysis revealed a main decomposition at 640° C. for the silicone grease, leaving a residue of 22% by mass, which was assumed to be an SiC/SiO$_2$ mix. Neither the CO$_2$ nor the Nd:YAG was able to volatilise the silicone, leaving in both cases a sticky black residue. The excimer, however, removes the silicone without any trace of residue discernable microscopically. The Si—C and Si—O bonds in silicone are again less than the 4.99 eV of the excimer photons, making photolytic bond scission the principal interaction mode. Photolytic ablation is a non-equilibrium process, and the temperatures calculated for the silicone case were the maximum possible case for the ablated fragments, well above 2000° C. Temperatures calculated for the Ti64 surface are below the $\beta$-transus. In practice, the Ti64 appears untouched, with only traces of silicon detectable by XPS as discussed below, and no evidence of oxidation. For the other two laser systems, temperatures are high enough for the decomposition at 640° C., but not sufficient for volatilisation of the solid residue.

X-ray photo-electron spectroscopy was undertaken on Ti64 samples to determine the surface composition, as received and after laser treatment, to an accuracy to 0.1 atomic percent and a depth range of 2-10 nm. The as-received samples were dominated by oxygen-containing organic compounds, with low levels of titanium, titanium oxides and nitrogen, and with trace quantities of calcium silicon and iron. For the silicone grease contaminated, Nd:YAG laser processed specimens, the treatment did not alter the samples in any way, leaving the surface chemistry unchanged (i.e. identical to the untreated silicone). For the contaminated $CO_2$ treated samples, high levels of nitrogen containing organic material were still present, with the titanium surface detected as oxides and carbides, indicating thermally induced reactions with the contaminants and oxidation. For the excimer trials, hydraulic oil and silicone grease were applied, and were processed at high fluence (400 mJ·cm$^{-2}$) and low fluence (150 mJ·cm$^{-2}$), with argon shrouding. Post-treatment results showed organic fragment and free carbon levels significantly reduced, with only a trace residue of silicon detected.

The effect of the laser cleaning on EB welding was assessed. In the case of the Nd:YAG-cleaned Ti64 samples, all zones—both processed and uncleaned—were radiographically free from defects. For the $CO_2$ laser-cleaned samples all welds, including seeded contaminants, were also defect free. This demonstrated both that Ti64 welds have not been adversely affected by laser cleaning, and are tolerant to a level of residual contaminant. However for a more sensitive Ti6246 alloy, cleaning of weld faces using a $CO_2$ laser has as yet not produced pore-free welds. All the Ti6246 welds displayed a fine edge of weld chain porosity along the entire sample length. Defect free welds were produced when excimer laser cleaning Ti64 and Ti6246 to remove hydraulic oil, silicone grease and a range of other trial contaminants.

The effect of the laser cleaning on diffusion bonding was assessed. All Nd:YAG and $CO_2$ trials produced insufficient bond quality in laser processed zones, the $CO_2$ laser processed samples being worse in defect nature and extent of defective joint. Although no individual defects were observable on ultrasonic evaluation, metallographic assessment showed poor bond qualities, with a continuous linear witness of the bond line on all test zones. Impact tests from both irradiated and unprocessed zones failed with planar recognition of the bond line. The appearance of these joint line defects included both continuous chain porosity and zones with evidence of residual contamination and incomplete diffusion.

Both Nd:YAG and $CO_2$ processing prior to bonding produced an adverse effect on the entire surface condition. This type of widespread chain spherical porosity is indicative of a gaseous effect with surface tension, and is caused by absorption of gas in the surface layer, which even under a protective atmosphere would create such a surface diffusion zone preventing diffusion bonding. It is concluded that due to the higher surface temperature, the $CO_2$ laser-processed samples absorbed more gaseous contamination resulting in the larger pore size and greater pore density observed.

Figure 3:
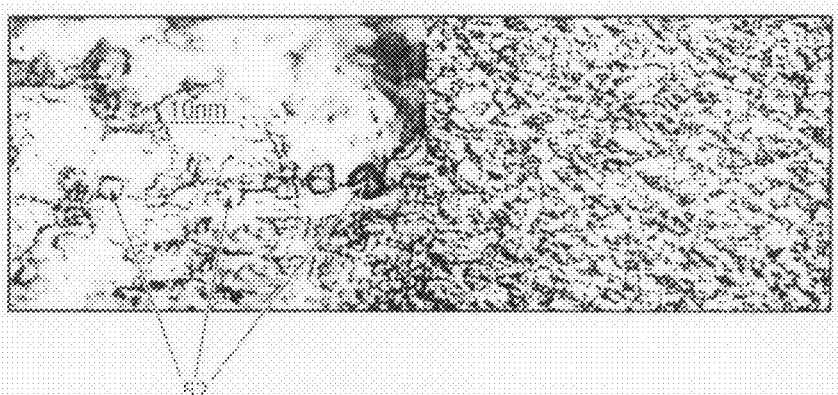
FIG. 3 shows micrographs of the excimer laser cleaned diffusion bond test specimens.

For the excimer laser cleaning the trials produced acceptable bond quality in both contaminated and control zones, with little micro-structural difference. In all cases fully diffused microstructures have been produced, except for isolated areas on the first sample contaminated by hydraulic oil (test piece H1, FIG. 3(a)), which exhibited occasional areas of joint line porosity (52). Impact tests from all specimens did not recognise the joint-line indicating parent metal bond strength, except for the isolated zones on test piece H1. Repeat processing of test piece H1 (FIG. 3(b)) produced acceptable results throughout, indicative of incomplete processing on the initial specimen.

The experimental and model results align well over the range of laser processing conditions explored, including surface temperature histories and oxide thicknesses. The work has shown that all three laser types are able to interact with low-boiling organics. However successful cleaning requires that fluences and associated surface temperatures remain below the damage threshold for the substrate. This was more easily accomplished with the excimer, dominantly because of the short pulse width. It is probable that in conjunction with photo-ablative decomposition of contaminants, this rapid heating causes sufficiently violent evaporation to remove all solid residues. The contaminants studied were very absorptive in the ultraviolet, less absorptive in the infrared, and least absorptive in the near-infrared. For the excimer, photo-ablation takes place, while for the other two wavelengths thermal vapourization dominates. In the case of silicone grease, full volatilisation is only obtained using the excimer. For the other two wavelengths, this is not the case, with a sticky residue remaining after treatment. With the Nd:YAG the dominant heating mechanism is conduction from the substrate and a baking effect is observed with strong interaction between the contaminant and the substrate. For the two pulsed lasers, oxidation is substantially less, while for the continuous-wave $CO_2$, the interaction time is sufficiently long for oxidation and secondary reactions to take place if care is not taken to work below the reaction threshold.

This process cleans surfaces more effectively than other existing chemical or non-chemical alternatives. The process is cheaper to operate, quicker, less labour intensive and more environment friendly than alternatives. This laser cleaning system has a wider potential range of applications e.g. cleaning of different substrates, contaminants and applications than alternative processes.

The selection of optimum laser cleaning system and parameters from the computer based model extends the range of process variants which may be successfully developed from this concept. Examples include the following:

alternative laser Systems e.g. $CO_2$, Nd:YAG (inc frequency double or tripled systems), excimer, pico- and femtosecond systems;

alternative inert gases as flow streams, shrouds or inert atmospheres;

single or split beams;

beam or part movement to effect rastering; and alternative translation geometries, eg rotational or translational.

It will be appreciated that the invention is not restricted to the sort of surface cleaning described in detail above, but may also be applied to a wide range of cleaning tasks on other materials and in other fields of industry. Examples include:

preparation for bonding, joining, gluing, plating, etching, coating, surface conditioning, texturing or surface modification;

surface sterilization (particularly in the food and medical industries);

particulate removal;

cleaning of precision components (e.g. photographic equipment, micro-electronic components); and cleaning for security purposes (e.g. tamper proof surfaces).

The invention claimed is:

1. A method for removing substances from a surface of an article using a laser source that produces a beam of laser radiation, the method comprising the steps of:

identifying material properties of the article;

customizing parameters of the beam based on the identified material properties to selectively remove one or more predetermined substances from the surface without removing other substances from the surface; and rastering the beam across the surface after the parameters are customized, wherein the parameters are selected from the group consisting of wavelength, frequency range, spot diameter, pulse duration, number of pulses, peak power, focal length, and beam incidence angle.

2. The method according to claim 1, wherein the parameters of the beam are customized using available material property data and a model of a cleaning system that includes the laser source.

3. The method according to claim 1, wherein the material properties include at least one of the reflectivity, density, specific heat, thermal conductivity, extinction coefficient or fluence damage threshold of the article.

4. The method according to claim 1, further comprising the step of:

providing an inert gas that flows across the surface while the beam is rastered across the surface.

* * * * *